United States Patent [19]

Gale

[11] Patent Number: 5,136,994
[45] Date of Patent: Aug. 11, 1992

[54] INTERNAL COMBUSTION ENGINE

[75] Inventor: Nigel F. Gale, San Antonio, Tex.

[73] Assignee: Southwest Research Institute, San Antonio, Tex.

[21] Appl. No.: 685,625

[22] Filed: Apr. 15, 1991

[51] Int. Cl.⁵ .............................................. F02F 3/26
[52] U.S. Cl. ................................ 123/276; 123/143 B; 123/143 R
[58] Field of Search ............... 123/276, 143 R, 143 A, 123/143 B, 145 R, 145 A

[56] References Cited

U.S. PATENT DOCUMENTS

| | | | |
|---|---|---|---|
| 1,564,906 | 10/1920 | Sokal | 123/276 |
| 1,724,526 | 5/1927 | Sokal | 123/276 |
| 2,656,830 | 10/1953 | Houdry | 123/191 |
| 2,978,360 | 4/1961 | Bradstreet et al. | 117/104 |
| 3,481,317 | 12/1969 | Hughes et al. | 123/143 R |
| 3,923,011 | 12/1975 | Pfefferle | 123/1 R |
| 3,954,093 | 5/1976 | Hughes | 123/145 R |
| 4,011,839 | 3/1977 | Pfefferle | 123/1 R |
| 4,061,120 | 12/1977 | Hughes | 123/143 A |
| 4,092,967 | 6/1978 | Haslett | 123/143 B |
| 4,369,746 | 1/1983 | Juring | 123/143 B |
| 4,389,983 | 6/1983 | Enga et al. | 123/143 B |
| 4,425,884 | 1/1984 | Thring et al. | 123/272 |
| 4,444,166 | 4/1984 | Kovacs et al. | 123/143 A |
| 4,530,340 | 7/1985 | Totman | 123/669 |
| 4,559,911 | 12/1985 | Bodine | 123/271 |
| 4,577,611 | 3/1986 | Hagino | 123/669 |
| 4,620,511 | 11/1986 | Brooks et al. | 123/145 A |
| 4,667,630 | 5/1987 | Sasaki | 123/276 |
| 4,669,433 | 6/1987 | Hoppia et al. | 123/276 |
| 4,773,368 | 9/1988 | Pfefferle | 123/272 |
| 4,779,587 | 10/1988 | Schwanzer et al. | 123/276 |
| 4,811,707 | 3/1989 | Pfefferle | 123/272 |
| 4,819,595 | 4/1989 | Pfefferle | 123/272 |
| 4,896,636 | 1/1990 | Pfeffarla | 123/145 A |
| 4,898,126 | 2/1990 | Merritt | 123/53 A |

Primary Examiner—Raymond A. Nelli
Attorney, Agent, or Firm—Baker & Botts

[57] ABSTRACT

The present invention is a catalytic ignition engine (10) having a catalytic hot plug (14,) mounted therein for 24 alcohol fuel. The hot plug (28) comprises a base material (32) coated at least partially with a catalyst (34), preferably platinum, and mounted on the top of the piston (18). The hot plug (11) is heated by combustion and is mounted on a support member (30) designed to reduce heat transfer from the hot plug (11) to piston (18). Consequently, the hot plug (11) remains at a temperature sufficiently high to cause ignition of alcohol fuel when the fuel is sprayed into the cylinder bore (14).

15 Claims, 1 Drawing Sheet

INTERNAL COMBUSTION ENGINE

TECHNICAL FIELD OF THE INVENTION

This invention relates generally to internal combustion engines of the compression ignition type. More particularly, but not by way of limitation, this invention relates to a compression ignition engine including a catalyst for igniting alcohol fuels.

BACKGROUND OF THE INVENTION

It has become increasingly attractive to use alcohol fuels like methanol and ethanol in compression ignition engines instead of diesel fuel because use of alcohol fuels results in lower exhaust emissions. Alcohol fuels, however, cannot ordinarily be used in typical compression ignition engines because alcohol, unlike diesel fuel, requires constant use of an ignition source for combustion during normal engine operation. In the usual compression ignition engine, air is drawn into the engine cylinder and then compressed by the piston as the piston moves towards its top dead-center position. The compression causes the air temperature to increase, and when diesel fuel is sprayed into the combustion chamber, the fuel ignites upon contact with the heated air. Alcohol fuels, however, will not ignite in an ordinary compression ignition engine because alcohols generally require higher air temperatures for ignition than can be achieved by compression in the engine. Consequently, if alcohol fuels are to be used in a compression ignition engine, an ignition source like a spark plug or a glow plug must be provided in the engine combustion chamber during normal engine operation. Unfortunately, spark plugs and glow plugs are not very durable when constantly used in engines burning alcohol fuel and must be frequently replaced.

One method of causing alcohol fuels to ignite in a compression ignition engine without use of spark plug or a glow plug during normal operation of the engine is to provide the combustion chamber with a catalyst. Use of a catalyst allows alcohols to ignite at significantly lower temperatures than they would without the catalyst. However, the catalyst must be maintained at a sufficiently high temperature to be effective in causing the ignition of the fuel. The catalyst can be heated to the required high temperature by the heat generated from fuel combustion.

Use of a catalyst in a combustion chamber is not new. For example, three patents issued to Pfefferle, U.S. Pat. No. 4,811,707, U.S. Pat. No. 4,819,595, and U.S. Pat. No. 4,773,368, describe compression ignition engines in which the internal walls of the combustion chamber, including the head of the piston, are partially coated with catalytic material that is applied over an underlying layer of insulating material. A problem with using the Pfefferle engines for burning alcohol fuel is that the catalyst is coated on the walls of the combustion chamber and a system for cooling the combustion chamber walls would also cool the catalyst. Such cooling may prevent the catalyst from reaching and maintaining a sufficiently high temperature to be effective in igniting the fuel.

A further problem posed by the Pfefferle engines is the difficulty and substantial expense that would be involved in retrofitting existing compression ignition engines with a coating of catalytic material. Moreover, if the catalyst should need to be replaced, substantial expense and difficulty would be involved in providing a new coating of catalytic material.

Consequently, a need has arisen for a catalytic device that can be easily installed in existing compression ignition engines and that can be maintained at sufficiently high temperatures so that the engine can be operated effectively on alcohol fuels.

SUMMARY OF THE INVENTION

The present invention provides a compression ignition engine with a catalytic hot plug for igniting alcohol fuel without the need for an ignition source like a spark or glow plug during normal engine operation. Alcohol fuels, unlike diesel fuel, will not normally ignite when injected into the combustion chamber of a compression ignition engine. However, ignition can be achieved in the presence of a catalyst that is maintained at a sufficiently high temperature. Accordingly, the present invention discloses a hot plug member coated with a catalyst, like platinum, and mounted preferably on the head of the piston. The hot plug is attached to a narrow support base, which is secured to the piston head in order to reduce heat transfer from the hot plug to the piston and thus maintain the hot plug at a sufficiently high temperature. One advantage of the present invention is that existing compression ignition engines can be easily and inexpensively retrofitted with the hot plug so that the engines can be used for burning alcohol fuels. Moreover, because the hot plug is easily installed, if a need arises to replace the catalyst, replacement can be accomplished easily and inexpensively.

BRIEF DESCRIPTION OF THE DRAWINGS

The foregoing and additional objects and advantages of the invention will become more apparent as the following detailed description is read in conjunction with the accompanying drawings wherein like reference characters denote like parts in all views and wherein.

DETAILED DESCRIPTION OF THE INVENTION

Figure 1:
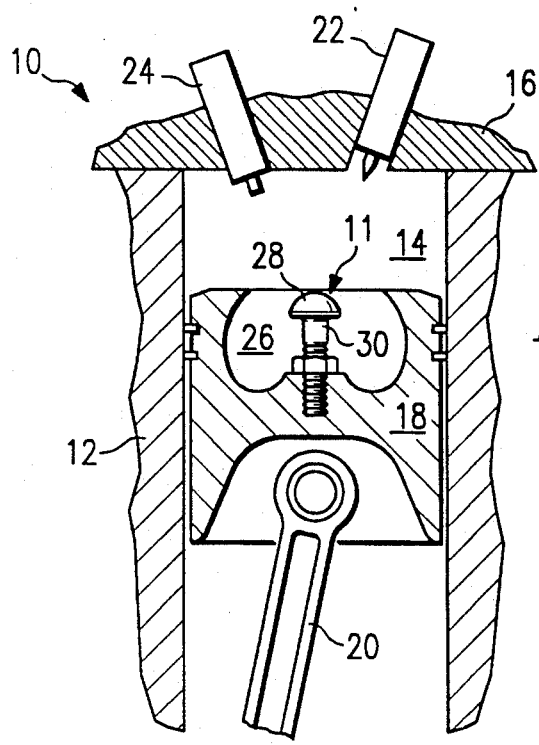
FIG. 1 is partial cross-sectional view of an engine equipped with a catalytic hot plug in accordance with the present invention.

FIG. 1 is a partial cross-sectional view of a compression ignition engine generally indicated by reference character 10 equipped with a catalytic hot plug 11 in accordance the preferred embodiment of present invention. The engine 10 comprises a cylinder block 12 having at least one cylinder bore 14 extending through the block 12. A head 16 is secured to the block 12 for closing the upper end of the cylinder 14. A piston 18 is disposed within the cylinder 14 for reciprocating movement. The piston 18 is pivotally connected to a connecting rod 20 (only partially shown), which extends downwardly to connect with a crankshaft (not shown).

Mounted in the head 16 is a fuel injector 22 for injecting fuel into the cylinder bore 14, and a glow plug 24 which partially extends into the cylinder bore 14. In an alternative embodiment, a spark plug (not shown) may be used in place of the glow plug 24.

A piston cavity 26 is formed within the upper portion of the piston 18. Mounted on the piston 18 within the cavity 26 is the catalytic hot plug 11. It is preferred that the hot plug 11 be mounted entirely within the cavity 26 so that no part of the hot plug 11 extends above the top of the piston 18. The hot plug 11 includes an enlarged top portion 28 and a support portion 30, which is secured to the piston 18. The connection of the support portion 30 to the piston 18 will be described in greater detail with reference to FIG. 2.

The fuel injector 22 is located in the head 16 and oriented so that when fuel is sprayed from the fuel injector 22 into the cylinder bore 14, the fuel spray contacts the hot plug top portion 28.

Figure 2:
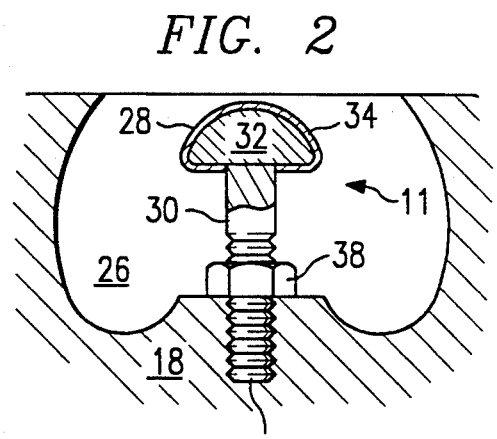
FIG. 2 is an enlarged, partial cross-sectional view of the hot plug mounted on the piston of the engine shown in FIG. 1.

FIG. 2 shows, in greater detail, the hot plug 11 as it is mounted on the piston 18. The hot plug 11 is shown partially cross-sectioned. The enlarged top portion 28 of the hot plug 11 comprises base material 32 and a layer of a catalyst 34. The base material 32 may comprise any material capable of withstanding the pressure and temperature conditions present in the cylinder bore 14 during engine operation. The catalyst 34 may comprise a number of materials such as platinum, vanadium, cobalt, a mixture of platinum and rhodium, a mixture of platinum and iridium, and a mixture of iron and nickel. It is preferred, however, that platinum be used as the catalyst 34. Although it is preferred that the top portion 28 comprise base material 32 and a layer of catalyst 34, it is possible to have the entire top portion 28 formed of catalytic material.

While the hot plug 11 shown in FIG. 2 has a rounded top portion 28, plugs having other shapes may be used. The hot plug top portion 28, however, must have a surface area sufficiently large to ensure that fuel spray directed toward the hot plug 11 will contact the top portion 28.

The hot plug top portion 28 is secured to the piston 18 by the hot plug support portion 30. The plug support portion 30 is preferably cylindrical in cross-section and is narrow in diameter relative to its height. Having a support portion 30 that is relatively narrow reduces heat transfer from the top portion 28 to the piston 18. Thus, the top portion 28 can be maintained at a sufficiently high temperature to cause ignition of alcohol fuel. Heat transfer may be further reduced by forming the plug support portion 30 from material having low thermal conductivity like ceramics. In the preferred embodiment, the plug support portion 30 is both narrow in diameter relative to its height and is made of a ceramic material.

The end of the plug support portion 30 distal to the top portion 28 is threaded so that it can be screwed into a corresponding threaded hole 36 formed in the piston 18. A lock nut 38 is screwed on the threaded portion of the plug support portion 30 flush against the surface of the piston 18 to firmly secure the plug 11 to the piston 18 and prevent loosening due to vibration caused by engine operation.

Although other means may be used to secure the hot plug 11 to the piston 18, in the preferred embodiment, the hot plug 11 is threadedly attached to the piston 18 so that the hot plug 11 can be easily installed and, if necessary, replaced.

OPERATION OF THE PREFERRED EMBODIMENT

When the engine 10 is to be started, the glow plug 24 is energized to provide heat to the cylinder bore 14. Air is drawn into the cylinder bore 14 through an inlet valve or port (not shown) and compressed as the piston 18 moves in the cylinder bore 14 towards the cylinder head 16. As a result of the compression, the air temperature rises. Alcohol fuel is then injected into the cylinder bore 14 through the fuel injector 22. The alcohol fuel ignites as it comes into contact with the compressed air. Ordinarily, alcohol fuel will not ignite in a compression ignition engine because the heat generated by air compression is insufficient to reach the fuel ignition point. However, alcohol fuel ignites in the engine 10 because additional heat is provided by the glow plug 24.

As combustion occurs and the engine 10 is operated, the temperature of the top portion 28 of the hot plug 11 mounted on the piston 18 rises, and when it has risen to a temperature sufficiently high to cause the alcohol fuel to ignite, the glow plug 24 is turned off. Thereafter, ignition of the fuel occurs when the fuel spray contacts the heated top portion 28 of the hot plug 11. As previously noted, the hot plug 11 comprises a top portion 28 that is mounted on a narrow insulated plug support portion 30. Consequently, heat transfer from the top portion 28 to the piston 18 is minimized and the temperature of the top portion 28 remains relatively constant compared to the gas temperature inside the cylinder bore 14. The temperature of the top portion 28 of the hot plug 11 is sufficiently high to cause ignition of the alcohol fuel.

DESCRIPTION OF THE EMBODIMENT OF FIG. 3

Figure 3:
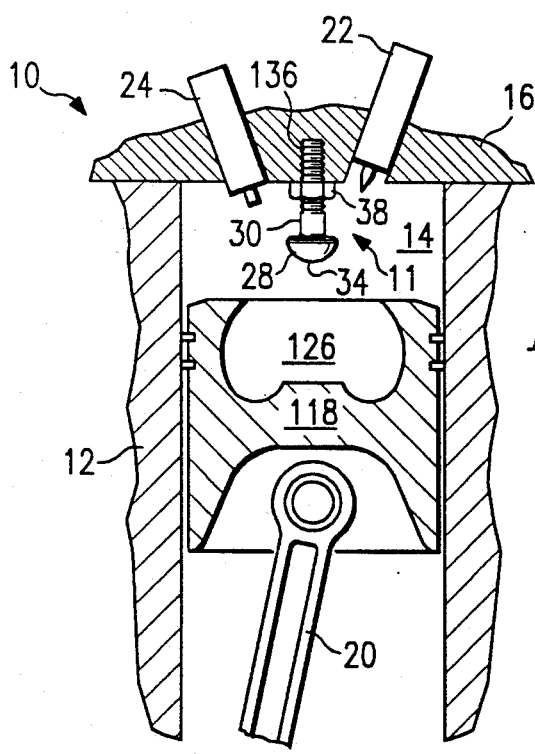
FIG. 3 is a view similar to FIG. 1, but showing the catalytic hot plug located in the head of the engine also in accordance with the present invention.

In the preferred embodiment shown in FIGS. 1 and 2, the hot plug 11 is mounted on the piston 18. Alternatively, the hot plug member 11 may be mounted anywhere in the engine combustion chamber defined by the cylinder head 16, the piston 18 and the cylinder block 12. In FIG. 3, an alternative embodiment of the invention, the hot plug 11 is shown mounted on a cylinder head of an engine generally indicated by reference character 10 Like the engine 10 shown in FIG. 1, the engine 10 comprises an engine block 12 having a cylinder bore 14 extending through the block 12. A piston 118 is mounted in the cylinder bore 14. The lower end of the piston 118 is pivotally connected to a connecting rod 20 (partially shown), which extends downwardly to connect with a crankshaft (not shown). A cavity 126 is formed in the upper portion of the piston 118 so that the hot plug 11 does not interfere with the upward movement of the piston 118 as it moves to a top dead center position.

The hot plug 11 is mounted in the head 16 The hot plug 11 shown in FIG. 3 is like the one shown in FIGS. 1 and 2; hot plug 11 comprises an enlarged top portion 28 secured to a support portion 30. The enlarged portion has an outer layer of catalyst 34 over underlying base material (not shown). The support portion 30 has a threaded end that is threadedly attached to a corresponding hole 136 formed in the cylinder head 16 A lock nut 38 firmly secures the hot plug 11 to the cylinder head 116 and prevents loosening due to vibration.

Also mounted in the cylinder head 16 is the glow plug 24 and the fuel injector 22. The fuel injector 22 is oriented so that fuel sprayed into the cylinder bore 14 contacts the enlarged top portion 28 of the hot plug 11.

The FIG. 3 embodiment is operated in the same manner as the FIG. 1 embodiment. When the engine 10 is to be started, the glow plug 24 is energized. Air is drawn into the cylinder bore 14 and compressed by the piston 118. Fuel is then sprayed into the cylinder bore 14. Additional heat generated by the glow plug 24 causes the fuel to ignite upon contact with the heated air. As combustion occurs and the engine 10 is operated, the hot plug 11 is heated. Because of the insulated plug support portion 30, the top portion 28 is maintained at a relatively constant and high temperature. The glow plug 24 is then turned off and thereafter ignition of fuel occurs as the fuel is sprayed onto the top portion 28 of the hot plug 11.

Thus, the compression ignition engines 10 can be operated with alcohol fuels without constant operation of an ignition source like the glow plug 24. One advantage of using the hot plug 11 is that it may be easily and inexpensively retrofitted in existing compression ignition engines. Additionally, if the catalyst should need to be replaced, replacement can also be achieved easily and inexpensively.

Although the present invention has been described with respect to specific, preferred embodiments thereof, various changes and modifications may be suggested to one skilled in the art, and it is intended that the present invention encompasses such changes and modifications as fall within the scope of the appended claims.

What is claimed is:

1. An apparatus for igniting alcohol fuel in a compression ignition engine having a cylinder block with a cylinder bore therein, a head connected to the block covering one end of the bore, a piston located in the cylinder bore movable toward and away from the head and fuel supply means for injecting fuel into a combustion chamber defined by the cylinder block, the cylinder head and the piston, the apparatus comprising:
   a catalytic ignition plug member having at least an exterior surface formed of a catalytic material; and
   support means for mounting said plug member within the combustion chamber and for thermally isolating the plug from the compression ignition engine.

2. The apparatus of claim 1, wherein a cavity is formed on the top of the piston and said plug member is mounted on the piston within the cavity.

3. The apparatus of claim 1, wherein said support means is narrow in width relative to its length for reducing heat transfer from said plug member.

4. The apparatus of claim 3, wherein said support means comprises material having low thermal conductivity.

5. The apparatus of claim 4, wherein said material having low thermal conductivity comprises a ceramic.

6. The apparatus of claim 1, wherein said support means comprises material having low thermal conductivity for reducing heat transfer from said plug member.

7. The apparatus of claim 6, wherein said material having low thermal conductivity comprises a ceramic.

8. The apparatus of claim 3, wherein said support means comprises a rod that is threaded and screwed into a threaded hole in the piston, said support means also includes a nut screwed on said rod adjacent the piston to secure said rod to the piston.

9. The apparatus of claim 1, wherein said plug member is positioned in the combustion chamber whereby fuel entering the combustion chamber contacts said plug member.

10. The apparatus of claim 1, wherein said catalytic material comprises platinum.

11. The apparatus of claim 5, wherein said catalytic material comprises platinum.

12. The apparatus of claim 7, wherein said catalytic material comprises platinum.

13. The apparatus of claim 9, wherein said catalytic material comprises platinum.

14. An apparatus for igniting alcohol fuel in an internal combustion engine of the compression ignition type having at least one cylinder in which is mounted a piston for reciprocating motion comprising:
    a plug member at least partially coated with a catalyst; and
    support means for mounting said plug to the piston and reducing heat transfer from said plug to the piston.

15. A method of operating a compression ignition engine with alcohol fuel having at least one cylinder bore in which is mounted a piston for reciprocating motion comprising:
    heating a plug member covered with a catalyst to a temperature sufficiently high to cause ignition of alcohol fuel upon contact with the plug member;
    maintaining the plug member at the sufficiently high temperature by thermally isolating the plug member from the engine;
    drawing air into the cylinder bore;
    compressing the air by upward movement of the piston; and
    injecting alcohol fuel into the cylinder bore onto the plug member causing the fuel to ignite, forcing the piston downward and heating the plug member to the sufficiently high temperature.

* * * * *